United States Patent [19]

Pearson

[11] Patent Number: 4,525,438
[45] Date of Patent: Jun. 25, 1985

[54] RECOMBINATION MULTICELL ELECTRIC STORAGE BATTERY

[75] Inventor: Ernest J. Pearson, Manchester, England

[73] Assignee: Chloride Group Public Limited Company, London, England

[21] Appl. No.: 547,226

[22] Filed: Oct. 31, 1983

[30] Foreign Application Priority Data

Oct. 29, 1982 [GB] United Kingdom ............... 8230957
Jul. 14, 1983 [GB] United Kingdom ............... 8319050

[51] Int. Cl.$^3$ ............................................. H01M 6/42
[52] U.S. Cl. ................................... 429/149; 429/160; 429/210
[58] Field of Search ............... 429/149, 152, 160, 57, 429/210, 242, 136

[56] References Cited

U.S. PATENT DOCUMENTS

| | | | |
|---|---|---|---|
| 759,058 | 5/1904 | Apple | 429/149 |
| 3,941,615 | 3/1976 | McDowall | 429/149 |
| 4,209,575 | 6/1980 | McDowall et al. | 429/146 |
| 4,331,747 | 5/1982 | Julian et al. | 429/160 |
| 4,383,011 | 5/1983 | McClelland et al. | 429/149 X |
| 4,425,412 | 1/1984 | Dittmann et al. | 429/152 X |

FOREIGN PATENT DOCUMENTS

1430205 3/1976 United Kingdom .
2070844 9/1981 United Kingdom .

*Primary Examiner*—Anthony Skapars
*Attorney, Agent, or Firm*—Finnegan, Henderson, Farabow, Garrett & Dunner

[57] ABSTRACT

A recombination lead acid battery includes a plurality of cells comprising alternating positive and negative plates interleaved with separator material. Every alternate plate in the two electrical end cells constitutes an unipolar plate connected to a terminal pillar and each remaining plate constitutes one half of a bipolar pair of plates connected by means of an integral bridge piece to its other half in an adjacent cell. The bridge pieces together constitute intercell connectors and those cells which are directly connected by an intercell connector are spaced apart only by the intercell connector and separated only by an air gap while those cells which are not directly connected by an intercell connector are separated by an intercell partition integral with the battery container.

8 Claims, 12 Drawing Figures

RECOMBINATION MULTICELL ELECTRIC STORAGE BATTERY

The present invention relates to multicell electric storage batteries of the type containing substantially no mobile electrolyte, e.g. batteries in which the electrolyte is in gel form or recombination batteries in which substantially all the electrolyte is absorbed in the plates and separators. The invention is concerned in particular with such batteries of lead acid type. Recombination batteries are those which contain a reduced amount of electrolyte such that substantially all the electrolyte is absorbed in the plates and separators and in which the gas evolved within them during operation or charging is not normally vented to the atmosphere but is induced to recombine within the battery.

Conventional lead acid batteries include a plurality of cells containing alternating positive and negative plates each of which has an upstanding plate lug. The cells are electrically connected but electrolytically isolated by intercell partitions which are integral with the container and which are sealed to the lid and the plates of each polarity in each cell are connected together by a respective plate strap and plate straps of opposite polarity in adjacent cells are connected together by an intercell connector. The steps of forming the plate straps and forming the intercell connectors are frequently combined, but nevertheless this is a time consuming and thus expensive operation which requires a substantial amount of lead or lead alloy. The electrical paths through the plate straps and intercell connectors are relatively long with the result that the battery has an appreciable internal resistance. Furthermore the grids which act as carriers for the active material of the plates and thus the plates themselves are made relatively thick so as to exhibit the rigidity which is essential if the plates are to withstand the forces to which they are subject during the assembly of the battery. This thickness of the plates results in their including more lead than is necessary as regards electrochemical requirements and a utilisation of the active material which is substantially less than the theoretical maximum.

It is highly desirable to minimise the amount of lead or lead alloy used in the plates and in the plate straps and intercell connectors and, if possible, to eliminate the steps of forming the plate straps and intercell connectors all together. It is also desirable that the intercell current paths should be as short as possible thereby reducing the internal resistance of the battery and thus increasing its maximum output current and thus its cranking power in the case of an automotive battery.

Conventional lead acid batteries are flooded with electrolyte and to ensure a reliable electrolytic seal between adjacent cells it is in practice necessary to form a gas-tight seal between these cells. The seal is achieved by virtue of intercell partitions which are integral with the battery container and which are sealed to the battery lid during assembly of the battery and in addition it is necessary to form a reliable seal around the intercell connectors, which of necessity extend between adjacent cells, at those positions where they pass through or over the intercell partitions. The provision of integral intercell partitions adds to the tooling and assembly costs and the sealing of the partitions to the lid and of all the intercell connectors adds considerably to the complexity and cost of assembly.

It has, however, been discovered that with batteries containing no mobile electrolyte, in particular recombination batteries, there is a reduced risk of intercell ionic leakage occurring, primarily because there is no free electrolyte available for the conduction of leakage currents. As a consequence, a gas-tight seal between adjacent cells is not necessary. It has, however, always been believed that an intercell partition, though not necessarily a continuous, sealed partition is necessary between adjacent cells in order to avoid premature failure of the battery. British Patent Specification No. 2062945 discloses a six cell recombination battery in which the cells are accommodated in respective open-topped plastics bags within an uncompartmented box. The plates of all the cells lie in respective spaced parallel planes and the plastics bags electrolytically isolate adjacent cells whilst nevertheless permitting the cells to be tightly packed together so that the separator material is under the compressive force which is necessary for recombination operation.

The omission of integral intercell partitions represents an economy but the fitting of plastics bags over the plates of each cell is an additional assembly step and the plastics bags, which of necessity extend above the tops of the plates and separators complicate the formation of the plate straps and intercell connectors. In addition, there is a risk that the plastics bags are perforated during assembly and that such perforation will remain unnoticed and lead to rapid failure of the battery due to internal short-circuiting.

Accordingly it is an object of the present invention to provide a multicell electric storage battery containing substantially no mobile electrolyte, particularly a battery of recombination type, which is simpler and cheaper to assemble than known batteries and has advantageous electrical and electrochemical characteristics.

According to the present invention there is provided an electric storage battery of the type containing substantially no mobile electrolyte including two cells which afford opposed adjacent surfaces and which are directly connected by an intercell connector, the said cells being spaced apart only by the said intercell connector and the said opposed surfaces being separated only by an air gap.

Thus the present invention is based on the recognition that the previous belief that some form of partition between electrically connected cells is essential to prevent short-circuit currents flowing, very possibly as a result of relative movement of the cells, is untrue. Thus the cells may be spaced apart and maintained spaced apart by only the intercell connector which produces a considerable economy of assembly without the risk of rapid failure of the battery.

In the preferred embodiment the intercell connector is constituted by a plurality of bridge pieces, each of which interconnects a single plate in one of the two cells to a respective plate of opposite polarity in the other cell. Each bridge piece is preferably integrally formed with the two plates which it interconnects and each connected pair of plates are preferably substantially coplanar. Thus in this preferred embodiment the or each directly electrically connected pair of cells is spaced apart by only a plurality of bridge pieces and by virtue of the fact that there are of necessity bridge pieces distributed over the entire thickness of the cells transverse to the planes of the plates and that the bridge pieces are integral with the plates they connect the plates are reliably restrained against relative movement and short-circuits between the cells are rendered impossible.

According to a further aspect of the present invention there is provided an electric storage battery comprising a plurality of cells electrically connected in series, each cell comprising a stack of plates of alternating polarity interleaved with separator material, each plate, with the exception of every alternate plate in the two electrical end cells, being electrically connected to a substantially coplanar plate of opposite polarity in an adjacent cell by an integral bridge piece, the bridge pieces together constituting intercell connectors, every alternate plate in the two electrical end cells being connected to the battery terminals, each cell having at least one surface which is adjacent and opposed to a respective surface of a further cell, each pair of cells which is directly connected by an intercell connector being spaced apart and maintained in spaced relationship by only the said intercell connector and each pair of opposed surfaces afforded by a pair of adjacent cells which is not directly connected by an intercell connector being associated with restraining means which prevent relative movement of those cells resulting in contact of the said opposed surfaces.

Thus in the battery in accordance with this aspect of the present invention all those cells which are directly connected by an intercell connector are spaced apart and maintained in their relative spacing by only the intercell connector which constitutes a stack of bridge pieces. It will, however, be appreciated that this does not exclude the possibility of there being, for instance, a packing piece between the two cells which merely occupies part of the space between them and serves no structural or electrolytic isolation function and is not necessary to restrain relative movement of the cells or to prevent such movement resulting in contact of the opposed surfaces of the cells. If the cells are arranged in a single line all pairs of adjacent cells will of course be directly electrically connected by an intercell connector, but if the cells are arranged in two or more lines or some assymmetrical configuration there will be one or more pairs of cells which are adjacent but not directly connected. Slight relative movement or rotation of the cells could result in contact of the opposed surfaces afforded by such pairs of cells and accordingly these surfaces are associated with restraining means which prevent relative movement all together or prevent such movement resulting in contact of the surfaces, which contact would of course produce an internal short circuit in the battery.

The restraining means may constitute a clamp restraining the cells in their desired relative positions or one or more projections on the container but it is preferred that the restraining means comprises a substantially continuous intercell partition extending between the opposed surfaces afforded by the or each pair of cells which are adjacent but not directly connected by an intercell connector. Such a continuous partition, which is preferably integral with the battery container, not only prevents contact of the opposed surfaces but also prevents lead dendrites growing from one surface and ultimately contacting the other surface thereby internally short circuiting the battery.

The cells are preferably accommodated in a container closed by a lid, all the plates lying in planes substantially parallel to the lid. This configuration permits a clamp to be applied to all the cells to exert the necessary compressive force for satisfactory operation, in the case of a recombination battery, and/or to restrain the cells against relative movement or this force may be exerted by the lid itself.

The cells may be arranged in two lines and it is preferred that all the intercell connectors extend between the lines and every pair of adjacent cells in the same line is separated by a respective intercell partition integral with the container in which the cells are accommodated. In this event the container is preferably of substantially rectangular section with one or more intercell partitions integral with each side wall, the intercell partitions extending substantially only to the centre of the container and being offset from the inercell partitions on the other side of the container. The or each intercell connector may comprise two or more spaced series of bridge pieces and it is found that this more reliably restrains the cells connected by the intercell connector against relative movement or rotation.

The plates are conveniently all of rectangular shape but this is not essential and they may be of any desired shape. It is, however, very desirable that the area and also the shape of all the plates are the same.

Further features and details of the present invention will be apparent from the following description of certain specific embodiments which is given by way of example only with reference to the accompanying drawings, in which.

Figure 1:
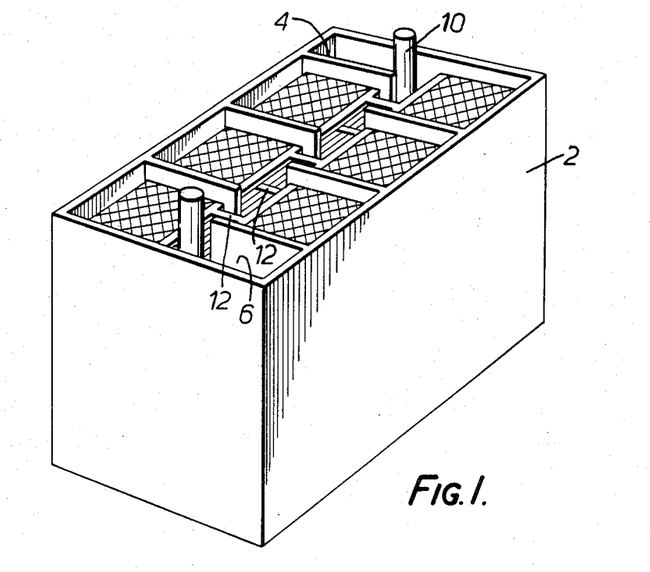
FIG. 1 is a perspective view of a 12 volt lead acid automotive battery of recombination type from which the lid has been omitted for the sake of clarity.
Figure 2:
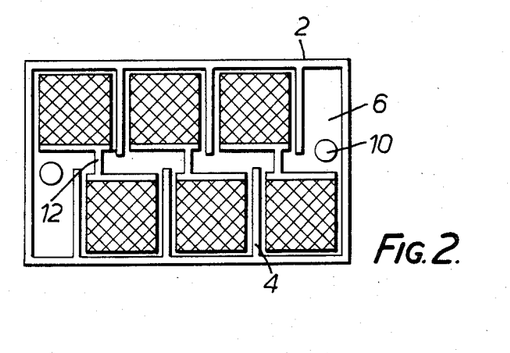
FIG. 2 is a plan view of the battery of FIG. 1 showing only the top layer of plates.
Figure 3:
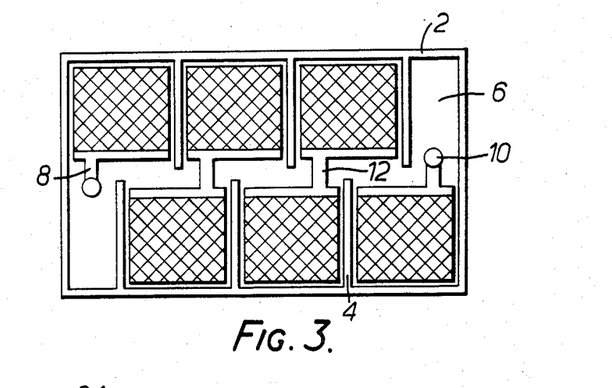
FIG. 3 is a view similar to FIG. 2 showing only the layer of plates below the top layer.

Referring first to FIGS. 1 to 3, the battery includes a rectangular section container 2 of polypropylene or like material integral with each of whose two longer sides ae three intercell partitions 4. Each partition 4 extends substantially only to the longitudinal centre line of the container and the partitions on one side of the container are offset from those on the other side by a distance substantially equal to one half of the distance between adjacent partitions. The partitions divide the interior of the container into two lines of three equally sized compartments at one end of which is an empty space 6 and at the other end of the other of which is a similar empty space.

Each compartment defined by the intercell partitions contains a stack of planar horizontal alternating positive and negative plates interleaved with compressible fibrous absorbent separator material, which in this case comprises a sheet of microfine glass fibres. Every alternate plate in the two end cells, that is to say the left hand cell in the upper line and the right hand cell in the lower line as seen in FIGS. 2 and 3, constitutes a unipolar plate having a lug 8 projecting therefrom. The lugs 8 are thus disposed in two vertical stacks which are connected to respective positive and negative terminal pillars 10 which are situated in the spaces 6 and which project through the battery lid. The remaining plates in the two end cells and all the plates in the other cells each constitute one half of a bipolar pair of plates which is connected to its other half in a cell in the other line of cells by an integral bridge piece 12 which extends perpendicular to the direction of the length of the lines of cells.

Each cell is defined by four vertical substantially planar surfaces, at least two of which are spaced from and opposed to a corresponding parallel surface of an adjacent cell. Certain of the pairs of opposed surfaces extend transverse to the length of the battery and the remainder are inclined thereto and extend parallel to the length of the battery.

Each cell contains an amount of electrolyte which is insufficient to saturate the electrodes and separator material and if gas is evolved during charging of the battery this is induced to recombine within the battery. The container is sealed by a lid (not shown) which is provided with a single safety vent with which each cell communicates and through which gas may be vented if it is evolved at a rate in excess of that at which it can be recombined. The lid, or pads (not shown) on the underside of the lid engage the tops of the cell elements thereby restraining them against vibration and minimising the volume of the space in which a potentially explosive gas mixture may accumulate. As may be seen in FIG. 2, there is an appreciable gap between each cell and the adjacent side wall of the container to permit the ready introduction of the electrolyte into the battery and/or to accommodate excess electrolyte at the time when the battery is subjected to its initial formation.

In a modified construction, which is not illustrated, the bridge pieces 12 extend at an acute angle to the direction in which the lines of cells extend. This permits the empty spaces 6 to be reduced in volume but does not permit these to be dispensed with altogether when the container is of rectangular section.

Figure 4:
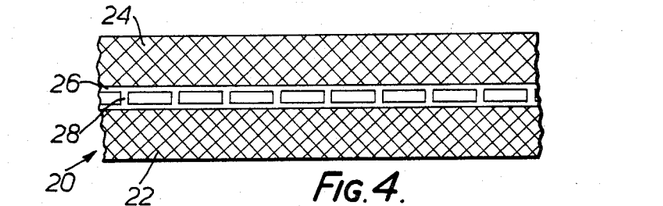
FIG. 4 is a plan view of a single expanded electrode member for use in the assembly of a battery in accordance with the invention.
Figure 5:
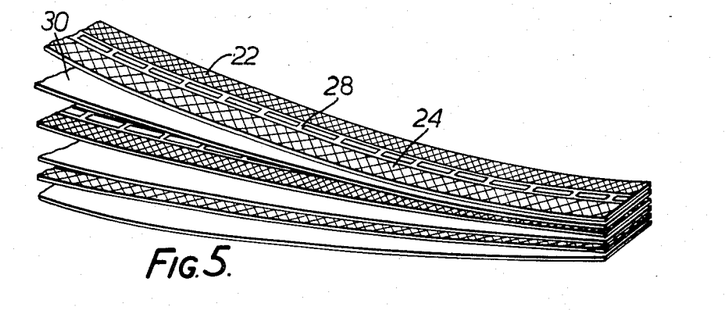
FIG. 5 illustrates diagrammatically the formation of the laminated structure of electrode members and separator material.
Figure 6:
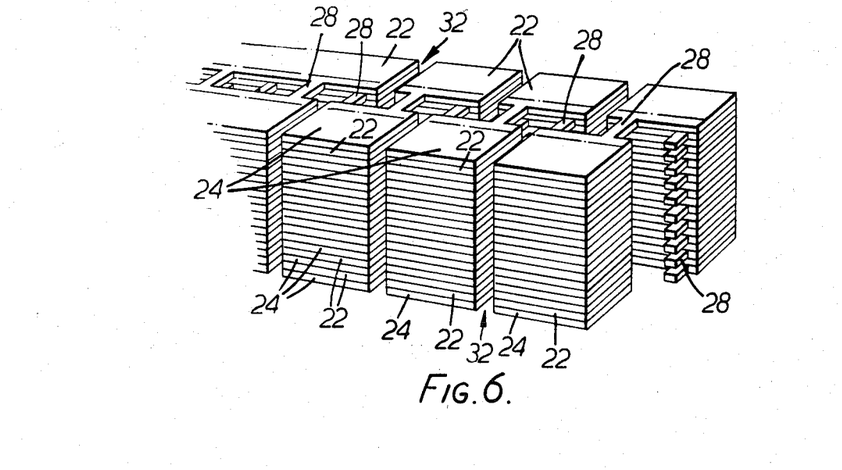
FIG. 6 shows the laminated structure after the cuts have been made in the two sides.

The battery in accordance with the invention may be manufactured by a method which will now be described with reference to FIGS. 4 to 6. A plurality of elongate or continuous electrode members or grid arrays 20, of which one is shown in FIG. 4, are formed comprising two continuous spaced grids 22 and 24 of lead or lead alloy each having a respective selvedge 26. Each grid array is substantially symmetrical about a median line 40. The selvedges are integrally connected at spaced intervals by bridge pieces 28. The grid arrays may be cast in a conventional casting machine but in this embodiment a strip of lead or lead alloy is continuously expanded in an expander machine leaving an unexpanded central land from which rectangular portions are subsequently removed to form apertures separated by the bridge pieces 28. The grids 22 and 24 are then pasted with positive and negative active material respectively or alternatively they are both pasted with the same universal active material, that is to say an active material which can be electrolytically formed into either positive or negative active material. The grid structure of the positive grid 22 is preferably smaller than that of the negative grid 24 since positive active material may require more physical support than negative active material. The meshes of the grids are preferably of decreasing cross-section with increasing distance away from the bridge pieces 28 to optimise the electrical performance of the battery per unit weight of lead utilised. A plurality of pasted grid arrays, which may now be regarded as plate arrays, are then overlaid to form a composite laminated structure, shown diagrammatically in FIG. 5, with an elongate strip of microfine glass fibre separator material 30 interleaved between each adjacent pair of elongate grids 22, 24. The plate arrays are superposed such that each active area of each plate array is adjacent to an active area of opposite polarity on the or each adjacent plate array. In addition, adjacent plate arrays are offset longitudinally by half a pitch with the result that the bridge pieces of each plate array are adjacent to the centres of the apertures defined by the bridge pieces of the or each adjacent plate array.

After formation of the laminated structure a plurality of cuts 32 is made in each side of it extending over its full height and into the central spaces defined by the bridge pieces 28. The cuts on each side of the laminated structure are spaced apart by a distance equal to the spacing of the bridge pieces of the plate arrays and the cuts on the two sides are offset longitudinally by half a pitch. The laminated structure is thereby separated into two continuous spaced lines of stacks of separate plates of alternating polarity of which every plate is connected to a plate of opposite polarity in a stack of plates in the other line by an integral bridge piece and thus constitutes one half of a bipolar pair of plates. The cuts may be formed in any suitable manner which does not deform the cut edges of the plates sufficiently far that they contact an adjacent plate in the same stack and it is found that this may be conveniently performed by means of a high speed band saw.

The two lines of stacks of plates are interconnected by the bridge pieces which are disposed in a plurality of stacks, the bridge pieces in each stack alternately connecting a positive plate in one stack in one line to a negative plate in a stack in the other line and a negative plate in the one line to a positive plate in the other line. Selected stacks of bridge pieces are then severed at their central point, for instance by means of the high speed band saw, to separate the laminated structure into battery elements. It will be appreciated that the stacks of bridge pieces to be severed are selected in accordance with the number of cells to be possessed by the finished battery, and in the case of a six cell 12 volt battery every sixth stack of bridge pieces is severed. Each battery element thus has a stack of severed bridge pieces at each end and it will be appreciated that in the finished battery these are connected to the battery terminals. This latter operation may be performed in any convenient manner but in this embodiment the laminated structure is placed in a clamp for the severing operation and the bridge pieces of each of the two stacks of severed bridge pieces are connected together by forming a mould cavity around them whilst still in the clamp, for instance by means of a two part comb mould or by dipping them into a mould cavity into which molten lead or lead alloy is introduced. Each battery element is then placed into a battery container with integral intercell partitions as illustrated in FIGS. 1 to 3, for instance by lowering a battery container onto the battery element whilst it is supported on the bottom plate of the open clamp, or alternatively each stack of plates is placed within a respective plastics bag and the battery element then placed into a battery container having no fixed intercell partitions. It will be appreciated that in the assembled battery each stack of plates constitutes one cell and that each plate in the two end cells, that is to say the cells at the electrical end of the series-connected cells, whose bridge piece has been severed constitutes a unipolar plate and is connected to a terminal of the battery whilst all the remaining plates constitute one half of a bipolar pair of plates whose other half is in the other line of cells.

Electrolyte is added to the cells in any convenient manner either before or after the insertion of the battery element into the battery container in an amount insufficient to saturate the electrodes and separator material and after the sealing of a lid to the battery container the battery is then complete. The lid, or pads on the lid, exert a compressive force on all the cells thereby pressing the plates and separators into intimate contact which is believed to be necessary for efficient recombination operation. The formation of plate straps and intercell connectors is not required since each plate which constitutes one half of a bipolar pair of plates is connected to its other half by a bridge piece which constitutes an intercell connector and thus only terminal pillars need to be formed to connect together the two stacks of severed bridge pieces which pillars may extend through the lid or be subsequently connected to respective terminals projecting up from the battery lid.

In the method described above the battery is assembled from electrode members comprising two elongate expanded grids connected by spaced solid bridge pieces. Such electrode members are most conveniently made by expanding a metallic strip to leave an unexpanded central land from which portions are subsequently removed. This method is very wasteful of material and thus in an alternative method of assembly, which is not illustrated, each electrode member comprises an elongate metallic strip expanded over its entire area. The central portions removed from these strips are much shorter than in the case in which there is a central unexpanded land and the remaining bridge pieces preferably have a length of between ¼ and ½ of the pitch of the bridge pieces. The bridge pieces are thus themselves of expanded grid form but are found to perform their electrical function perfectly adequately. It will be appreciated that the wastage in this method is substantially reduced firstly because the removed portions are much smaller and secondly because the removed portions are expanded and not solid metal.

In the embodiments described above the electrode members or grid arrays and the plates of the finished battery comprise expanded metal and it will be appreciated that in this case the grids are not identifiable as such in the electrode members and after pasting but prior to cutting the individual plates also are not identifiable and only become identifiable once the cuts have been made and the pasted electrode members separated into individual stacks of plates. However, in a further embodiment, which will be described with reference to FIGS. 7 and 8, the plates are cut from a cast array of pasted interconnected grids comprising two line of separately identifiable plates, the plates in each line being integrally connected by means of temporary links.

Figure 7:
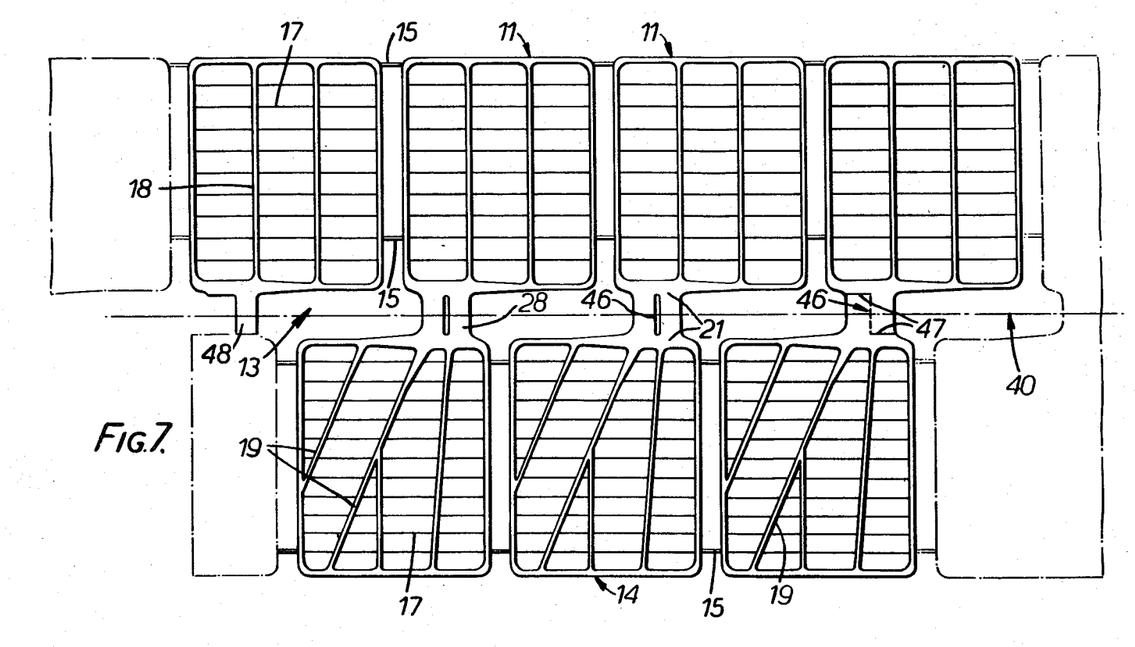
FIG. 7 is a plan view of a single cast electrode member or plate array for use in the assembly of an alternative construction of battery in accordance with the invention.

Referring now to FIG. 7, the battery grid array comprises a planar elongate strip of lead or lead alloy mesh which is continually cast on a casting machine generally of the type described in U.S. Pat. No. 4,349,067, a short length of which cast mesh is shown in FIG. 7. The casting is in the form of an array of grids arranged in two spaced parallel lines disposed on opposite sides of what may be termed a median line or line of symmetry 40. The grids 11 of one line are adapted to be formed into negative plates and are offset by half a pitch from the grids 14 of the other line which are adapted to be formed into positive plates. The two lines are separated by a gap 13 but each negative grid is integrally connected to a positive grid by a bridge piece or lug 28 which crosses the gap. The pitch of the lugs 28 is thus equal to the pitch of the grids in the two lines. The grids of each line are spaced apart but interconnected by integral temporary links 15 which give the cast elongate strip some stability but which are severed during assembly of the battery. Each grid is formed with bars 17 extending parallel to the length of the array which are closer spaced in the positive grids than in the negative grids. The negative grids also include bars 18 extending transverse to the length of the array whilst the positive grids include bars 19 generally radiating from the lugs 28. The grid frames are broadened adjacent their point of connection to the lugs 28, as indicated at 21. In general, the bars in the positive grids are wider than those in the negative grids and the thickness of the grids for a typical automotive battery is about one millimeter, or less. After casting, the strip is pasted, that is to say active material is applied to the grids. Thus positive and negative active material is applied to the lines of positive and negative grids respectively in any conventional manner.

Batteries are assembled from such pasted grid arrays, i.e. from plate arrays, by forming a laminated structure and then forming cuts in a manner similar to that described above. However, in this embodiment, the laminated structure is not continuous but each grid array is cut to the desired length prior to forming the laminated structure thereby avoiding the necessity of severing stacks of bridge pieces.

In one specific method of battery assembly a strip comprising 144 interconnecting grids of the form shown in FIG. 7 is cast, the two lines of grids are pasted with positive and negative active material respectively and a strip of separator material is then laid on each row of pasted grids, that is to say plates, and optionally lightly secured thereto. The strip is then severed into 24 arrays of 6 plates each by severing appropriate links 15 and bridge pieces 28 and the separator material overlying the links to be severed. A 24 layer laminated structure is then built up and it will be appreciated that this will necessitate the turning of every alternate plate array through 180° to permit the desired registry of plates of alternating polarity to be achieved.

when the laminated structure is separated into individual cell packs a total of four cuts is all that is required, each severing a temporary link 15 in each of the 24 layers. It will be appreciated that the unipolar plates in the two end cells, that is to say the cell at one end of one row and the other end of the other row, has a bridge piece which was severed prior to the formation of the laminated structure and thus terminates short of the other row.

The resultant laminated structure is similar to that shown diagrammatically in the right hand half of FIG.

6. As in the previous embodiments the laminated structure may be many layers thick and the precise number of layers will be related to the desired current capacity of the battery. In the first, third, fifth, etc. layers of the laminated structure the negative plates are on one side and in the second, fourth, etc. layers the negative plates are on the other side of the laminated structure.

As may be seen in FIG. 7, each bridge piece 28 is separated into two by a central gap 46 extending parallel to its length, i.e. transverse to the length of the rows. When the continuously cast strip is separated into individual grid arrays every sixth bridge piece is severed also and this is done by forming two cuts 47 which communicate with the gap 46 to leave two full length but half width terminal connectors, designated 48 in FIG. 7.

After the laminated structure has been built up from individual plate arrays it is clamped, as before, to facilitate its separation into individual cell packs by severing the links 15. The connectors 48 are disposed in two vertical stacks and a tapered terminal pillar 57 is then formed around each such stack, preferably by pouring molten lead into a mould placed around the stack. The cross section of the terminal posts 57 increases such that at their take-off end the cross-section is equal to the aggregate cross-section of each of the stacks of bridge pieces 28, which of course constitute the intercell connectors in the finished battery. The terminal pillars are positioned as close as possible to the inner faces of the grids to minimise the internal resistance of the battery.

Figure 8:
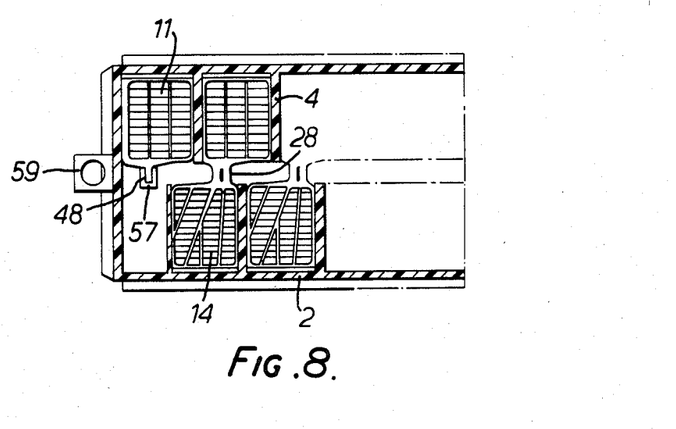
FIG. 8 is a view similar to FIG. 2 showing a battery assembled from cast plate arrays.

The severed structure is then placed as a unit into an outer container 2, seen in FIG. 8, of similar construction to that shown in FIG. 2. The battery is then filled with electrolyte and either before or after the addition of the electrolyte side terminal connectors 59 on the container are connected to the terminal posts 57 by resistance welding or the like. The battery is then electrolytically formed and the container sealed by a lid.

It will be appreciated that in the embodiments described above all those pairs of cells which are directly connected by a stack of bridge pieces, that is to say one cell in each line in each case, are maintained spaced apart only by the bridge pieces whilst those cells which are adjacent but not directly interconnected, that is to say adjacent cells in the same line, are separated by an integral intercell partition.

Figure 9:
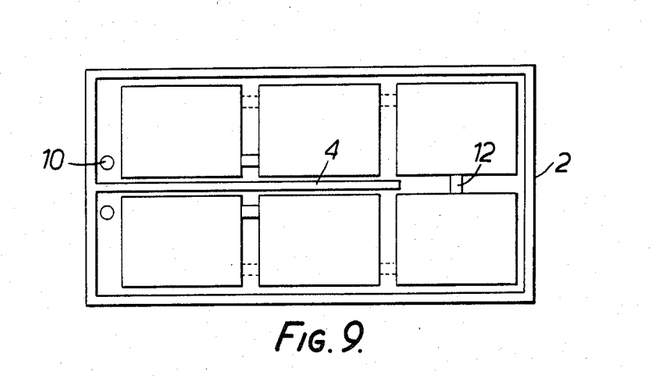
FIGS. 9 and 10 are views similar to FIGS. 2 and 3 respectively showing a modified construction of battery incorporating cast plate arrays.
Figure 10:
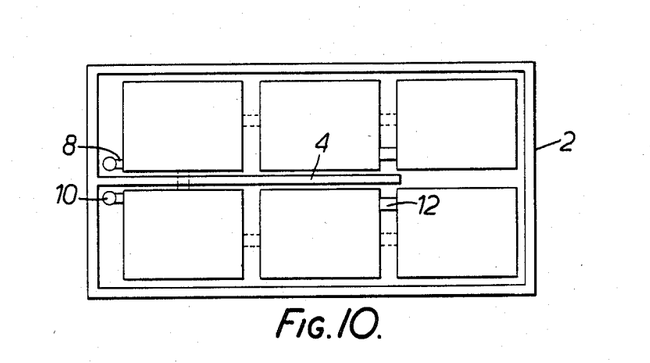

In the modified construction of 12 volt automotive battery illustrated diagrammatically in FIGS. 9 and 10 only one intercell connector, constituted by a stack of bridge pieces 12, extends between the two lines of cells and the other four such connectors extend in the direction of the length of the lines, two being situated in each line. This avoids the necessity of offsetting the two lines of cells and the six cells thus have together a substantially rectangular shape in plan. In addition, the polarity of the plates in each line in each planar plate array is not the same, as is the case in the previous embodiments, but alternates in each line. Those pairs of cells which are directly connected by an intercell connector are maintained spaced apart only by the bridge pieces constituting the intercell connector whilst those cells which are adjacent but not directly connected, namely the left hand two cells in the upper and lower lines of cells as seen in FIGS. 9 and 10, are separated by an intercell partition 4 integral with the container 2.

Such a battery is assembled by casting a plurality of two types of grid array shown in FIGS. 9 and 10 respectively in which the grids are connected by integral bridge pieces and also by integral temporary links 15, which are shown in dotted lines. The grid arrays are then all pasted with a universal active material or alternatively each grid is individually pasted with an active material which is specific to the polarity which it is to adopt in the finished battery. A laminated structure is then built up with the two types of plate array alternating and with each plate separated from the or each adjacent plate with which it is in registry by a strip of separator material. A total of six cuts are then made in the laminated structure to sever the temporary links 15 whilst leaving the bridge pieces 12. The battery is then completed as described above in connection with the previous embodiments.

Figure 11:
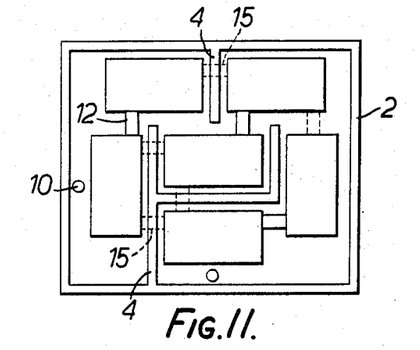
FIGS. 11 and 12 are further views similar to FIGS. 2 and 3 respectively showing a further modified construction of battery.
Figure 12:
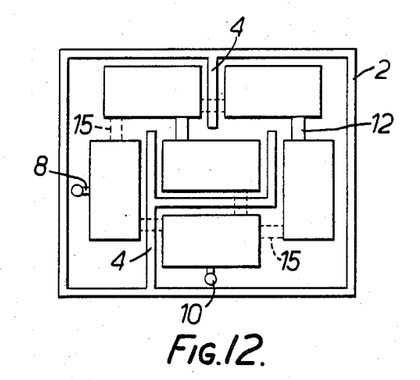

In the further modified construction seen in FIGS. 11 and 12, the cells are arranged assymmetrically and connected in series in the order indicated by the bridge pieces 12 seen in the two Figures. Those cells which are directly connected by bridge pieces are separated and spaced apart by only the bridge pieces and those cells which are adjacent but not directly connected are separated by intercell partitions 4 integral with the container 2. One partition, seen at the top of FIGS. 11 and 12 is planar whilst the other is substantially Y shaped and serves to separate several pairs of opposed surfaces afforded by adjacent cells. The battery is assembled by casting two types of plate array in which the plates are disposed in the assymmetrical configurations shown in FIGS. 11 and 12 respectively and connected together by a plurality of integral bridge pieces 12 and integral temporary links 15 (shown in dotted lines). A laminated structure is formed with the two types of array alternating and each plate being in registry with a plate of opposite polarity in the or each adjacent array. The laminated structure is then clamped and cuts are made between adjacent stacks of plates to sever the links 15 leaving the bridge pieces 12. The resultant battery element is ultimately placed into the outer container 2 having fixed intercell partitions 4 in the positions shown. In other respects the assembly of the battery proceeds as in the previous embodiment.

The term "batteries of the type containing substantially no mobile electrolyte" does not exclude the possibility that a small amount of free electrolyte may be present, at least at certain times. Thus after electrolytic formation there may be a small amount of free electrolyte present in a recombination battery but this will simply be electrolysed off once the battery is put into service thereby bringing the battery into a full recombination mode. Similarly, when a recombination battery is very deeply discharged a small amount of free water may be produced but this is reabsorbed when the battery is charged again.

Typical compositions for the positive and negative active material pastes are given in the table below:

|  | Positive | Negative |
| --- | --- | --- |
| Grey Oxide (PbO) (Kilograms) | 13.62 | 13.62 |
| Barium sulphate (grams) | — | 68 |
| Carbon black (grams) | — | 23 |
| Lead Stearate (grams) | — | 7 |
| Lignosulphonate sold under the Trade Mark VANISPERSE (grams) | — | 45 |
| Polyester fibre (3 mm) (grams) | 11.5 | 11.5 |
| Water (liters) | 1.68 | 1.53 |
| $H_2SO_4$ (1.4 specific gravity) | 1.02 | 0.87 |

| -continued | | |
|---|---|---|
| | Positive | Negative |
| (liters) | | |

The sulphuric acid electrolyte added to the battery typically has a specific gravity of 1.24 and is added in an amount of 0.417 liters per kilogram of total active material in the battery.

The battery makes very economical use of lead because all the lead used during casting is included in the finished battery except for the small amount of lead forming the temporary interconnecting links.

In view of the fact that the plates in the finished battery are "horizontal" and may be retained horizontal at all times during assembly of the battery the plates may be designed primarily for electrochemical efficiency since mechanical strength and in particular bending rigidity is not an important requirement. This enables the plates to be substantially thinner than in a conventional battery which results in a more efficient utilisation of active material and the need for less metallic lead in the battery. This fact coupled with the fact that the intercell connections are integral and necessarily of the minimum theoretical length results in the peak current which the battery may produce being very high, which capability may result in the case of an automotive battery in the battery having a reduced weight and thus reserve capacity for a given cranking power which is a function of the peak current.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An electric storage battery comprising a plurality of cells, including two electrical end cells, electrically connected in series, each cell comprising a stack of alternating positive and negative battery plates interleaved with separator material, said separator material being capable of absorbing electrolyte in an amount sufficient to provide an electrical connection between adjacent plates of opposite polarity in the stacks, the battery containing substantially no mobile electrolyte, and each plate, with the exception of every alternate plate in the two electrical end cells, being electrically connected to a substantially coplanar plate of opposite polarity in an adjacent cell by an integral bridge piece, the bridge pieces together constituting intercell connectors, and every alternate plate in the two electrical end cells being connected to a battery terminal, each cell having at least one surface which is adjacent and opposed to a respective surface of a further cell, each pair of cells which is directly connected by an intercell connector being spaced apart and maintained in spaced relationship by only the said intercell connector and each pair of opposed surfaces of a pair of adjacent cells which is not directly connected by an intercell connector being associated with restraining means which prevent relative movement of those cells resulting in contact of the said opposed surfaces.

2. The battery of claim 1 in which the restraining means comprises an intercell partition extending between the opposed surfaces afforded by each pair of cells which are adjacent but not directly connected by an intercell connector.

3. The battery of claim 2 in which the cells are located in a container having one or more integral intercell partitions.

4. The battery of claim 1 in which the cells are located in a container closed by a lid, all the plates lying in planes substantially parallel to the lid.

5. The battery of claim 1 in which the cells are arranged in two lines.

6. The battery of claim 5 in which the cells are located in a container having one or more intercell partitions, all the intercell connectors extending between the lines and every pair of adjacent cells in the same line being separated by an intercell partition integral with the container.

7. The battery of claim 6 in which the container is of a substantially rectangular section having two sidewalls and two end walls, with one or more intercell partitions integral with each sidewall, the intercell partitions extending substantially only to the center of the container and being offset from the intercell partitions on the other side of the container.

8. An electric storage battery comprising a plurality of cells, each cell comprising a stack of alternating positive and negative battery plates interleaved with separator material, said separator material being capable of absorbing electrolyte in an amount sufficient to provide an electrical connection between adjacent plates of opposite polarity in the stacks, the battery containing substantially no mobile electrolyte and having at least two cells which afford opposed adjacent surfaces and which are directly connected by a plurality of bridge pieces constituting an intercell connector, each bridge piece being integrally formed with and interconnecting a single plate in one of the two cells to a respective plate of opposite polarity in the other cell with each so connected pair of plates being substantially coplanar, the said cells being spaced apart only by the said bridge pieces and the said opposed surfaces being separated only by an air gap.

* * * * *